Figure 1:
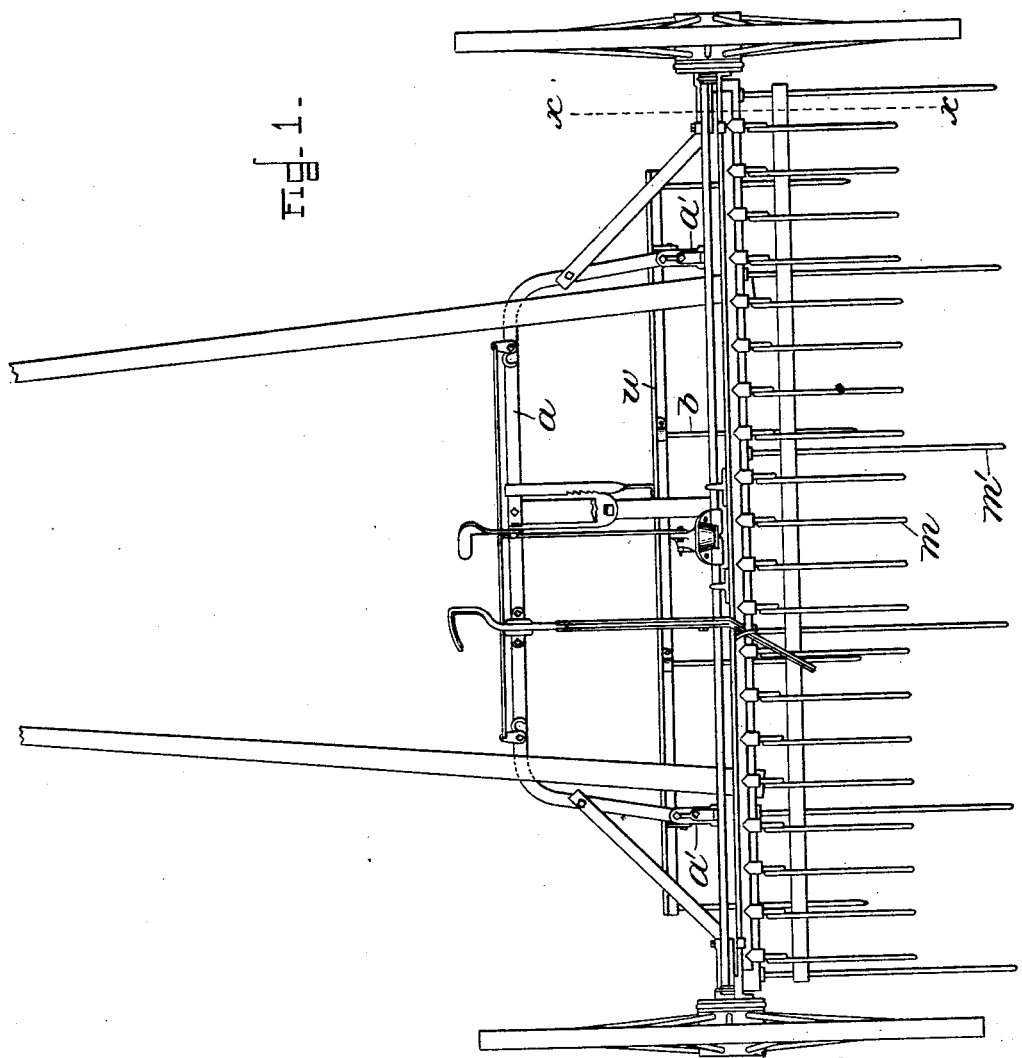

(No Model.)  C. S. SHARP.  2 Sheets—Sheet 1.
HORSE RAKE.

No. 587,762.  Patented Aug. 10, 1897.

Witnesses
Arthur L. Randall
Edmund A. Bates

Inventor
Chas. S. Sharp
by B. J. Hayes
Atty

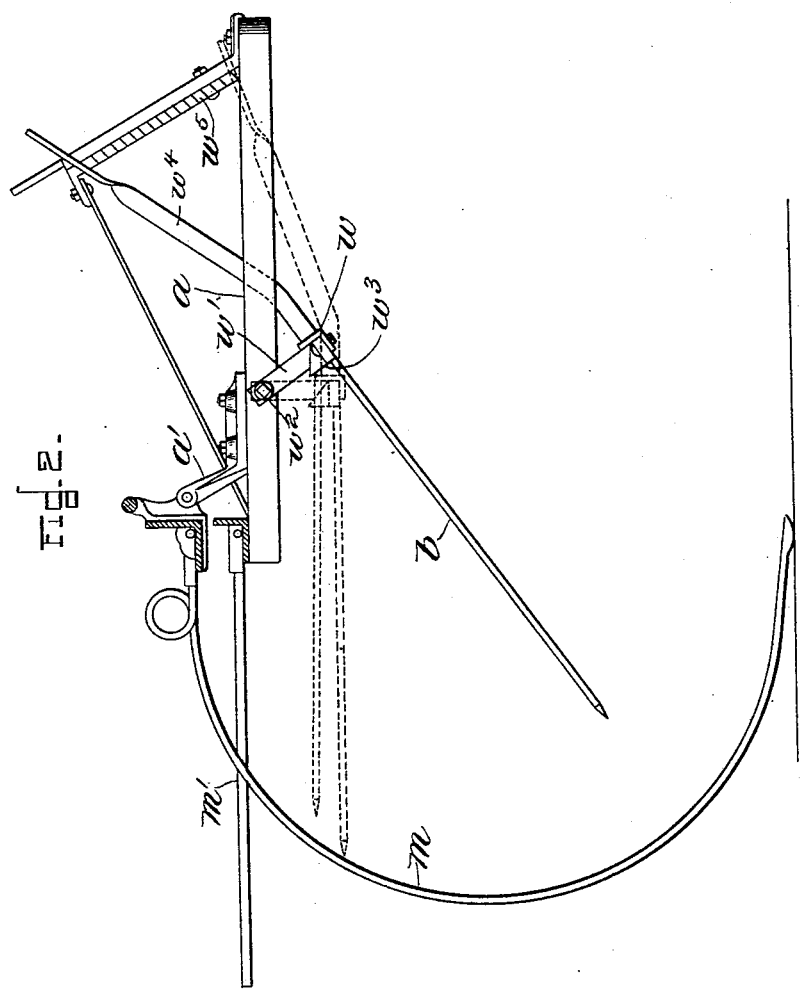

UNITED STATES PATENT OFFICE.

CHARLES S. SHARP, OF AUBURN, NEW YORK, ASSIGNOR TO THE D. M. OSBORNE & COMPANY, OF SAME PLACE.

HORSE-RAKE.

SPECIFICATION forming part of Letters Patent No. 587,762, dated August 10, 1897.

Application filed January 20, 1897. Serial No. 619,960. (No model.)

*To all whom it may concern:*

Be it known that I, CHARLES S. SHARP, of Auburn, in the county of Cayuga and State of New York, have invented an Improvement in Horse-Rakes, of which the following description, in connection with the accompanying drawings, is a specification, like letters on the drawings representing like parts.

In another application for Letters Patent, Serial No. 591,786, filed by me a horse-rake is shown having in combination with any usual or suitable rake-teeth and stripper bars or fingers or equivalent clearing devices for the rake-teeth a set of check-teeth, of which there may be any suitable number, which project rearwardly into the hay-receiving space of the rake-teeth and terminate in front of said teeth, and the hay which accumulates in the hay-receiving space of the rake-teeth is thrust upon said check-teeth and thereby prevented from rolling in said hay-receiving space as it accumulates. In said application the check-teeth are separately attached at their forward ends to the rake-frame and are independently adjustable.

This invention has for its object to provide a frame—such, for instance, as a cross-bar—by which a number of check-teeth may be supported, preferably in such a manner as to independently rise and fall, and so disposed as to enter the hay-receiving space at any point desired and to provide suitable adjusting devices for said frame, whereby all of the check-teeth may be adjusted and held with their points at different elevations above the ground.

In carrying out this invention a transverse bar may be employed as the tooth-carrying frame, and to said bar the check-teeth will be loosely connected at their forward ends, so that while supported by said bar they may independently rise and fall.

The tooth-carrying frame may be attached to the draft-frame by pivotal supports, whereby it may be moved to simultaneously adjust the check-teeth, and an adjusting device will be provided for it, which will preferably have as a coöperative part of it a foot-lever so disposed as to be easily accessible to the rider.

Figure 1 shows in plan view a horse-rake provided with simultaneously-adjustable check-teeth embodying this invention; Fig. 2, a detail showing in side elevation many of the essential parts of the rake, the check-teeth, their supporting-frame, and adjusting device therefor.

The horse-rake herein shown and to which my present invention is applied is of substantially the same construction as represented in United States Patent No. 517,491, dated April 3, 1894, to which reference may be had, but this particular rake is shown merely for the sake of illustrating the invention, as any other well-known or suitable form might as well be shown.

The rake-teeth $m$, of which there may be as many as desired and which may be of any usual or suitable construction, are secured to a rolling rake-head, and the stripper bars or fingers $m'$, which are secured to the frame of the rake and project rearwardly between said rake-teeth $m$, may also be of any usual or suitable construction, so long as they serve as clearing devices for the rake-teeth.

The draft-frame $a$ has brackets $a'$ erected thereon formed with bifurcated ends, which receive ears on the rolling rake-head, and pivot-bolts are provided which pass through said bifurcated ends and the said ears, and thereby pivotally connect the rolling rake-head to the draft-frame.

The check-teeth $b$ for the hay which accumulates in the hay-receiving space in the rake-teeth $m$, of which there may be several, are composed of rods like unto the rake-teeth, and they are supported at their forward ends and project rearwardly into the hay-receiving space of the rake-teeth, terminating, however, a short distance in front of said rake-teeth.

The check-teeth $b$ are herein shown as made straight from end to end and provided with more or less pointed rear ends and loosely or flexibly attached at their forward ends to a cross-bar $w$, which extends across the machine beneath the draft-frame $a$, and said bar $w$ is connected with said draft-frame by hangers or straps $w'$, the lower ends of which are secured to said cross-bar by rivets, bolts, or otherwise, and the upper ends of which are pivotally connected with said draft-frame by pivot bolts or pins $w^2$. The cross-bar $w$, so supported and bearing the check-teeth $b$, is adapted to be moved bodily in the arc of a circle about the pivots $w^2$.

The loose or flexible connections for the check-teeth, by means of which they are connected with the cross-bar, are herein shown as produced by bending the forward ends of the teeth at right angles to the main part thereof and inclosing said right-angular ends in or by recessed clips $w^3$, which are secured to said cross-bar. The clips $w^3$ are formed with transverse recesses for the laterally-turned or right-angular ends of the check-teeth and also with vertical recesses adjoining said transverse recesses in which work the shanks of the check-teeth next to their right-angularly formed ends, thereby giving to the check-teeth a limited independent movement. As the cross-bar $w$ is moved in the arc of a circle about the pivots $w^2$ the check-teeth $b$ will be caused to occupy different elevated positions and different angles, and the points of said teeth will be moved nearer to or farther from said rake-teeth. As a means of moving or adjusting the cross-bar $w$ to thus simultaneously adjust all the check-teeth I have herein attached to said cross-bar $w$ a foot-lever $w^4$, which projects forward and is adapted to coöperate with or engage a ratchet-toothed bar (or it may be a rack-bar) $w^5$, secured to and supported by the draft-frame $a$. This foot-lever is so located as to be within easy reach of the rider.

The check-teeth $b$ normally occupy a position oblique to the ground, as shown by full lines, Fig. 2, but are free to rise independently into the dotted-line position shown in said figure when required—as, for instance, when lifting the rake-teeth to dump.

While the rake is gathering the hay the rake-teeth and check-teeth will occupy the position shown by full lines, Fig. 2, and as the hay enters the hay-receiving space of the rake-teeth it will be caught by and thrust upon said check-teeth and will thus be prevented from rolling over in the hay-receiving space of the rake-teeth.

When dumping the accumulated hay, the rake-teeth are elevated, as usual, and the check-teeth $b$ will rise somewhat, owing to their loose connection with the frame by reason of being entangled with the hay, and the hay is then free to be discharged, the check-teeth $b$ being withdrawn from the hay as the rake advances. As soon as the upward strain on the check-teeth is relieved they will fall and resume their normal oblique position.

Instead of employing the adjusting device herein shown and described for the tooth-carrying frame $w$, it having as a coöperative part of it a foot-lever, I desire it to be understood that said tooth-carrying frame may be adjusted by any other form or construction of adjusting device, whereby all of said check-teeth may be simultaneously adjusted and yet come within the spirit and scope of this invention.

I claim—

1. In a rake, rake-teeth, means for operating them, and stripper bars or fingers, combined with check-teeth projecting into the hay-receiving space, a frame to which they are connected, and an adjusting device for said frame whereby the check-teeth may be simultaneously adjusted and held at different elevations, substantially as described.

2. In a rake, rake-teeth, means for operating them, and stripper bars or fingers, combined with check-teeth projecting into the hay-receiving space, a frame to which they are loosely connected to rise and fall independently, and an adjusting device for said frame, whereby the check-teeth may be simultaneously adjusted and held at different elevations, substantially as described.

3. In a rake, rake-teeth, means for operating them, and stripper bars or fingers, combined with check-teeth projecting into the hay-receiving space, a frame bearing them, and an adjusting device for said frame having as a coöperative part of it a foot-lever, substantially as described.

4. In a rake, rake-teeth, means for operating them, and stripper bars or fingers, combined with check-teeth, a cross-bar to which they are connected, supports for said bar whereby it is movable bodily in the arc of a circle, and means for moving it and holding it in its different adjusted positions, substantially as described.

In testimony whereof I have signed my name to this specification in the presence of two subscribing witnesses.

CHARLES S. SHARP.

Witnesses:
RAYMOND M. ATHERLY,
SIDNEY E. FARWELL.